US010762563B2

(12) United States Patent
Belanger et al.

(10) Patent No.: US 10,762,563 B2
(45) Date of Patent: Sep. 1, 2020

(54) MONITORING AND CONTROLLING CONTINUOUS STOCHASTIC PROCESSES BASED ON EVENTS IN TIME SERIES DATA

(71) Applicant: Cerebri AI Inc., Austin, TX (US)

(72) Inventors: Jean Belanger, Austin, TX (US); Alain Briançon, Germantown, MD (US); James Stojanov, Burlington (CA); Gabriel M. Silberman, Austin, TX (US)

(73) Assignee: Cerebri AI Inc., Austin, TX (US)

( * ) Notice: Subject to any disclaimer, the term of this patent is extended or adjusted under 35 U.S.C. 154(b) by 0 days.

(21) Appl. No.: 16/510,840

(22) Filed: Jul. 12, 2019

(65) Prior Publication Data

US 2019/0340684 A1 Nov. 7, 2019

Related U.S. Application Data

(63) Continuation-in-part of application No. 15/456,059, filed on Mar. 10, 2017, and a continuation-in-part of application No. 16/127,933, filed on Sep. 11, 2018, now Pat. No. 10,402,723.

(60) Provisional application No. 62/698,769, filed on Jul. 16, 2018.

(51) Int. Cl.
*G06Q 40/02* (2012.01)
*G06N 20/00* (2019.01)
*G06N 7/00* (2006.01)

(52) U.S. Cl.
CPC ........... *G06Q 40/025* (2013.01); *G06N 7/005* (2013.01); *G06N 20/00* (2019.01)

(58) Field of Classification Search
CPC .............................. G06Q 10/00; G06Q 40/00
USPC ................................................. 705/7.12–7.29
See application file for complete search history.

(56) References Cited

U.S. PATENT DOCUMENTS

| 6,430,539 | B1 | 8/2002 | Lazarus |
| 7,966,282 | B2 | 6/2011 | Pinckney et al. |
| 8,069,101 | B1 | 11/2011 | von Groll |
| 8,700,414 | B2 * | 4/2014 | Rothermel ........... G06Q 10/103 705/1.1 |

(Continued)

FOREIGN PATENT DOCUMENTS

| KR | 1020167003639 | 3/2016 |
| WO | 2014075108 A2 | 5/2014 |

OTHER PUBLICATIONS

Robert (A Project Risk Metric), Apr. 2004, Journal of Defense Software Engineering, p. 1-4 (Year: 2004).*

(Continued)

*Primary Examiner* — Romain Jeanty
(74) *Attorney, Agent, or Firm* — Pillsbury Winthrop Shaw Pittman, LLP

(57) ABSTRACT

Provided is process, including: obtaining interaction-event records; determining, based on at least some of the interaction-event records, sets of event-risk scores, wherein: at least some respective event-risk scores are indicative of an effective of a respective risk ascribed by a first entity to a respective aspect of a second entity; and at least some respective event-risk scores are based on both: respective contributions of respective corresponding events to a subsequent event, and a risk ascribed to a subsequent event; and storing the sets of event-risk scores in memory.

26 Claims, 4 Drawing Sheets

(56) References Cited

U.S. PATENT DOCUMENTS

| | | | |
|---|---|---|---|
| 8,799,017 B2* | 8/2014 | Parker | G06Q 10/10 |
| | | | 705/2 |
| 8,831,972 B2* | 9/2014 | Angell | G06Q 30/02 |
| | | | 705/14.26 |
| 8,949,164 B1 | 2/2015 | Mohler | |
| 9,015,084 B2 | 4/2015 | Thieberger | |
| 9,886,670 B2 | 2/2018 | Dirac et al. | |
| 10,366,346 B2 | 7/2019 | Achin | |
| 10,373,177 B2 | 8/2019 | Vijayaraghavan | |
| 10,496,927 B2 | 12/2019 | Achin | |
| 2006/0155627 A1 | 7/2006 | Horowitz | |
| 2007/0124767 A1 | 5/2007 | Laskowski-bender et al. | |
| 2008/0147511 A1* | 6/2008 | Edwards | G06Q 30/00 |
| | | | 705/18 |
| 2010/0042552 A1 | 2/2010 | Horowitz | |
| 2010/0094791 A1 | 4/2010 | Miltonberger | |
| 2011/0054960 A1 | 3/2011 | Bhatia | |
| 2011/0246251 A1 | 10/2011 | Saunders | |
| 2011/0282778 A1* | 11/2011 | Wright | G06Q 20/04 |
| | | | 705/38 |
| 2012/0054019 A1 | 3/2012 | Kitts et al. | |
| 2012/0284080 A1 | 11/2012 | De Oliveira et al. | |
| 2013/0138502 A1 | 5/2013 | Rama | |
| 2013/0185232 A1 | 7/2013 | Hochstein | |
| 2013/0311203 A1* | 11/2013 | Parker | G06Q 10/10 |
| | | | 705/3 |
| 2013/0311387 A1* | 11/2013 | Schmerler | G06Q 30/018 |
| | | | 705/317 |
| 2014/0244351 A1 | 8/2014 | Symons | |
| 2014/0358828 A1 | 12/2014 | Phillipps et al. | |
| 2015/0134413 A1 | 5/2015 | Deshpande | |
| 2015/0161529 A1 | 6/2015 | Kondaji | |
| 2015/0248651 A1 | 9/2015 | Akutagawa | |
| 2016/0071120 A1 | 3/2016 | Fleischman | |
| 2016/0086222 A1 | 3/2016 | Kurapati | |
| 2016/0104091 A1 | 4/2016 | Fletcher | |
| 2016/0170997 A1 | 6/2016 | Chandrasekaran | |
| 2016/0358090 A1 | 12/2016 | Irvine et al. | |
| 2017/0083937 A1 | 3/2017 | Fadli | |
| 2017/0177995 A1 | 6/2017 | Hillar et al. | |
| 2017/0220925 A1 | 8/2017 | Alsharif et al. | |
| 2017/0227673 A1 | 8/2017 | Venugopalan et al. | |
| 2017/0236081 A1* | 8/2017 | Grady Smith | G06Q 10/067 |
| | | | 705/7.36 |
| 2017/0310824 A1 | 10/2017 | Piaggio et al. | |
| 2017/0316453 A1 | 11/2017 | Kitagishi | |
| 2017/0330058 A1 | 11/2017 | Silberman et al. | |
| 2017/0330205 A1 | 11/2017 | Belanger et al. | |
| 2018/0129970 A1 | 5/2018 | Gottschlich et al. | |
| 2018/0150757 A1 | 5/2018 | Aggarwal et al. | |
| 2018/0165604 A1 | 6/2018 | Minkin et al. | |
| 2018/0225588 A1 | 8/2018 | Khidekel et al. | |
| 2018/0233130 A1 | 8/2018 | Kaskari | |
| 2018/0255383 A1 | 9/2018 | Cella et al. | |
| 2018/0330258 A1 | 11/2018 | Harris | |
| 2019/0020670 A1 | 1/2019 | Brabec | |
| 2019/0080347 A1 | 3/2019 | Smith | |
| 2019/0138643 A1 | 5/2019 | Saini | |
| 2019/0295162 A1* | 9/2019 | Wang | H04L 9/30 |

OTHER PUBLICATIONS

Internet Archive "Salesforce Einstein: Machine Learning in a Multi-Tenant Environment," https://web.archive.org/web/20170217002707/ https://www.salesforce.com/products/ captured Feb. 17, 2017 (7 pages).

Joy and Sanjeev, "Behavior Graphs for Understanding Customer Journeys," Jan. 22, 2015, https://apigee.com/about/blog/developer/behavior-graphs-understanding-customer-journeys, pp. 1 to 12.

Jason Brownlee, Improve Model Accuracy with Data Pre-Processing, Aug. 4, 2014, Machine Learning Mastery, https://machinelearningmastery.com/improve-model-accuracy-with-data-pre-processing/ (Year 2014).

Gondek et al., A framework for merging and ranking of answers in DeepQA, May/Jul. 2012, Digital Object Identifier: 10.1147/JRD.2012.2188760, IBM, https://ieexplore.ieee.org/stamp.jsp?tp=&amumber=6177810 (Year:2012).

Apte et al., "Segmentation-Based Modeling for Advanced Targeted Marketing," Aug. 26, 2001, ACM New York, NY USA 2001, ISBN: 1-58113-391-X Order No. 618011 doi>10.1145/502512.502573, https://dl.acm.org/doi/pdf/10.1145/502512.502573?download=true (Year: 2001).

"Supervised and unsupervised learning," 2004, neural networks with java, https://www.nnwj.de/supervised-unsupervised.html (Year 2004).

International Search Report in related International Application No. PCT/US2019/041733 dated Oct. 30, 2019, 3 pages.

Written Opinion in related International Application No. PCT/US2019/041733 dated Oct. 30, 2019, 5 pages.

\* cited by examiner

US 10,762,563 B2

MONITORING AND CONTROLLING CONTINUOUS STOCHASTIC PROCESSES BASED ON EVENTS IN TIME SERIES DATA

CROSS-REFERENCE TO RELATED APPLICATIONS

This patent claims the benefit of U.S. Provisional Patent Application 62/698,769, filed 16 Jul. 2018, titled DYNAMIC RISK SCORING BASED ON TIME SERIES DATA, is a continuation-in-part of U.S. patent application Ser. No. 15/456,059, filed 10 Mar. 2017, titled BUSINESS ARTIFICIAL INTELLIGENCE MANAGEMENT ENGINE, and is a continuation-in-part of U.S. patent application Ser. No. 16/127,933, filed 11 Sep. 2018, titled MULTI-STAGE MACHINE-LEARNING MODELS TO CONTROL PATH-DEPENDENT PROCESSES. The entire content of each afore-listed earlier-filed application is hereby incorporated by reference for all purposes.

BACKGROUND

1. Field

The present disclosure relates to artificial intelligence (AI) and more particularly to machine learning used for monitoring or controlling continuous stochastic processes based on discrete samples and other events in time series data.

2. Description of the Related Art

Computation to assess the likelihood of undesirable probabilistic events arises in a variety of scenarios. Often, in industrial process controls, a process exhibits stochastic characteristics in which the current state is only partially predictive, but not determinative of the state of the process in the future. Unpredictable events like the weather, random variation of aspects of inputs to the process, and the like, can lead to unpredictable outcomes, and often that unpredictability is magnified over time, particularly for complex systems in which the subsequent state depends partially on the current or past state. Similar issues arise in relation to predicting the likelihood of certain outcomes in other non-deterministic, complex systems, like the weather, the behavior of individual human agents, and the behaviors of collections of human agents. Due to incorrect assessments of such probabilities, often automated systems designed to intervene in or otherwise control such complex systems produce sub-optimal outputs, making undesirable outcomes more likely than is desirable. These issues are often aggravated when the consequences of different types of outcomes significantly varying in the amounts of influence on the outcome of a key performance metric for the process or other system, e.g., a low-probability event with a large effect (like forcing a shutdown of the manufacturing process) may present a significant threat, despite the relatively low probability, and mis-assessment of that low-probability may lead to a larger rate of occurrence of such events than is desirable.

SUMMARY

The following is a non-exhaustive listing of some aspects of the present techniques. These and other aspects are described in the following disclosure.

Some aspects include a process, including: obtaining, with a computer system, one or more out of plurality of datasets having a plurality of interaction-event records, wherein: the interaction-event records describe respective interaction events, the interaction-events are interactions in which a first entity has experiences or obtains other information pertaining to second entity, and at least some of the interaction-event records are associated with respective risks by which sequences of at least some of the interaction events relative to one another are ascertainable; determining, with the computer system, based on at least some of the interaction-event records, sets of event-risk scores, the sets corresponding to at least some of the interaction events, wherein: at least some respective event-risk scores are indicative of an effective of a respective risk ascribed by the first entity to a respective aspect of the second entity; and at least some respective event-risk scores are based on both: respective contributions of respective corresponding events to a subsequent event in the one or more out of the plurality of datasets, and a risk ascribed to a subsequent event in the one or more out of the plurality of datasets, the subsequent event occurring after the respective corresponding events; and storing, with the computer system, the sets of event-risk scores in memory.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
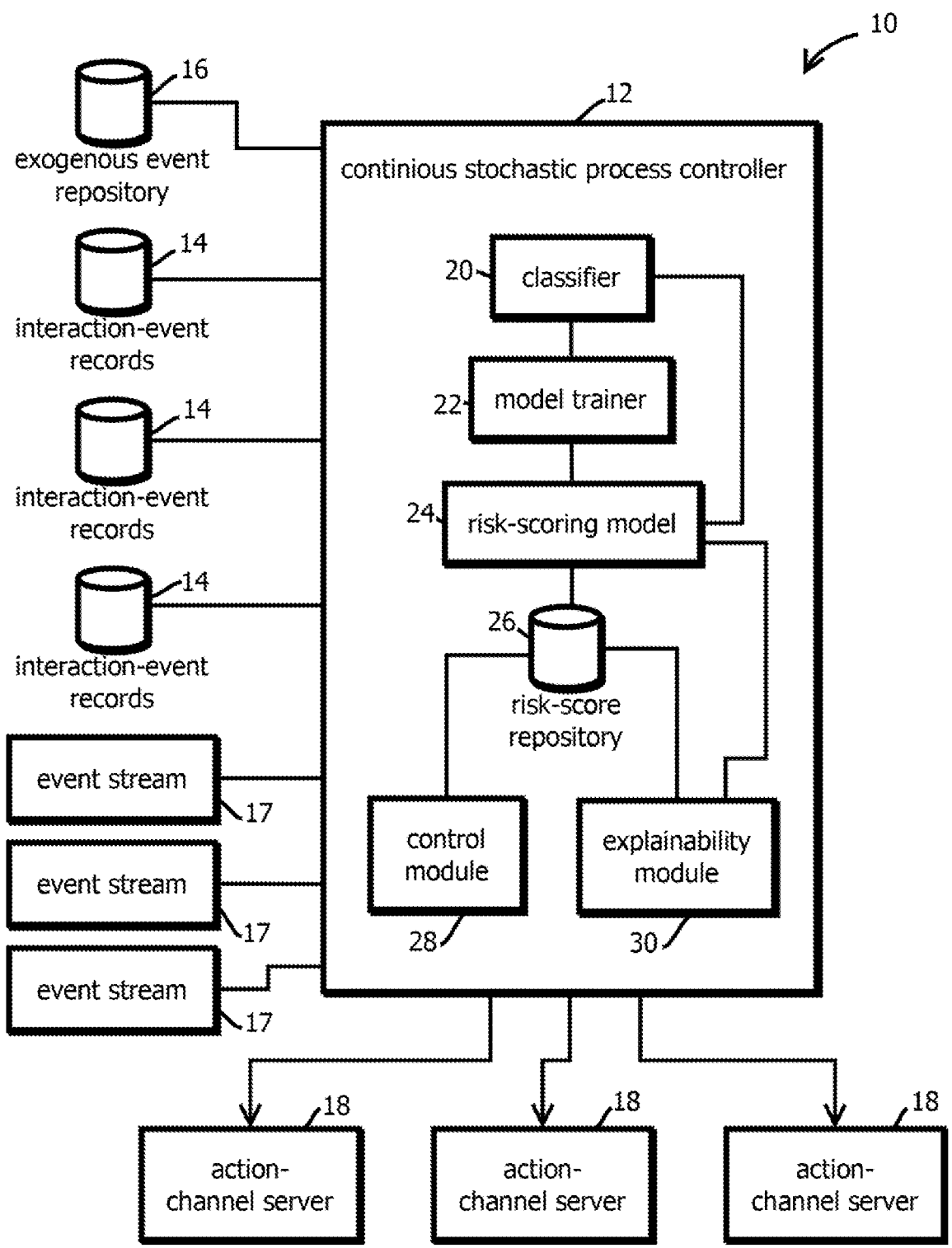
FIG. 1 is a logical architecture block diagram of an example continuous stochastic process controller and its computing environment in accordance with some embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of machine learning. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Computation to assess the likelihood of undesirable probabilistic events arises in a variety of scenarios. Variation of process outcomes in manufacturing processes (like variation within some range of dimensional tolerances) are often dependent, in part, on earlier states of the process, while still exhibiting an element of randomness. Similarly, in order to better manage risk at financial or obituary-impacted institutions such as insurance companies, wealth management companies, banks, credit unions, credit card companies and the like, they often must include risk computations at a deeper level in their organizations. This also applies to computer and office equipment leasing companies, phone companies selling wireless plans or devices on installment plans. Existing computational techniques, however, generally afford a temporally discrete signal (e.g., a score at the outset of a relationship) and fail to update estimated likelihoods of probabilistic events on an ongoing basis. The present techniques are described below with reference to risk assessment in the context of behavior of human agents, but it should be emphasized that the present techniques are not directed to methods of organizing human activities, like economic arrangements. Rather, such use cases are merely one practical application of the type of computational techniques described herein.

Managing risk as a continuous variable or signal provides the advantage of managing risk as a journey similar to customer journeys described in patent applications U.S. patent application Ser. No. 15/456,059, the contents of which are hereby incorporated by reference. Using this approach, in some embodiments, risk is no longer a static factor, in contrast to some traditional approaches such as a credit score or FICO score. Risk (e.g., a likelihood of an undesirable outcome, or expected utility thereof) may be a continuously managed signal (e.g., a parameter) that can be used to decide, configure products, recommend, trigger activities from the supplier to its customers and prospective customers. Some embodiments improve upon the techniques in this earlier patent filing to address technical challenges that arise when applying related techniques to risk management, e.g., characterizing risk as a continuous stochastic process.

For example, many conventional approaches used by suppliers to understand customers lack a way to quantify how a customer's risky behavior impacts a supplier and the supplier's willingness to sell certain types of products involving risk management on a continuing and consistent basis (e.g., by the microsecond, second, minute, hourly, daily, weekly, monthly, per interaction, per location, per trajectory, depending on the context). Risk management concerns are often material in sales of products such as loans, insurance policies, offering discounted or free phones or other equipment for which cost is recouped over the life of a follow-on service contract (and for which the seller often bears the risk of the subscriber canceling the contract before the cost is recouped), wallet services offering credit, credit cards, and other products having an implicit or explicit credit risk or moral hazard component. Risk management also impacts the management of overbooking and rerouting of passengers for airlines.

In addition, many conventional approaches fail to measure potential impact from customers on a customer-by-customer basis. For example, suppliers may use a "one size fits all" approach to credit rather than targeting customers (whether a person or a business) using an individualized approach. By considering available transactions, purchases, expenses, payment information and non-monetary information, a supplier, by operation of some embodiments, can quantify how each customer experience is a better reflection of their behavior. For example, the supplier, by operation of some embodiments, can measure potential revenue from each individual customer, the risk of customer defaulting on payments, pre-paying payments, and determine a value for each event (e.g., interaction) in an event timeline. Having such an insight can help the supplier, by operation of some embodiments, create credit decision, marketing and sales decisions that are tailored to each customer, e.g., tailored to the customer's preferences and circumstances, tailored to the customer's preferred communication style and communication channels, and the like.

The described approaches may be applied to systems, whether single or multi-component, for which risk-related incidents represent an undesired outcome. The information processed, in some embodiments, includes risk-related behavior of system components, its environment, and the people and systems it relates to, for the system under examination as well as similar systems.

The goal of a supplier (e.g., a business vendor or a service provider), is often to efficiently and cost-effectively maintain a close relationship with each customer while protecting the risk they take while extending de-facto credit or carrying a negative balance for a while. In some cases, the number of customers may be large, e.g., more than 10,000, more than a million, or more than ten million. This is often the case with loans, subsidized purchases, leases, and the like. In the case on insurance (which as used herein includes warranties), the premium charged is dependent on the risk a consumer takes. For a life insurance, rather than imposing that he does not start parachute jumping as a condition of the insurance, the insurer can adjust the rate once it discovers the consumer is parachute jumping—using pictures from Facebook posting, for instance. A supplier typically desires to understand what motivates a customer's actions to enable the supplier to (i) optimize the economic value that the supplier derives from the customer, (ii) provide offerings tailored to the customer's needs, (iii) provide offerings with terms that cause the customer to finalize a transaction, and (iv) insure that the customer risk of defaulting on financial obligations or health does not bring the value of said transaction to be negative (v) there is even the opportunity to help the customers understand how their individual behaviors can impact their personal credit. For example, prior to applying for a loan, a customer may have several interactions with banks, but visiting countries with no extradition treaty with the home country, the risk is much different than just looking at FICO score, if such information is available to either party the bank or the individual can change their behavior according.

Some embodiments create a customer risk journey (e.g., a temporally (or at least sequence) indexed record of events that may affect risk-related metrics and indicators) in the form of an event timeline integrating the different events that impact or otherwise reflect the risk behavior of a customer. Machine learning may be used to extract the appropriate patterns. The models built and trained with the risk journey time series may be used to score a step's (in the journey) risk posture in the form of a risk index. Journeys may be encoded in memory as a set of time-stamped or sequenced entries in an interaction-event record, each entry, in some cases, including an event and information about that event. The ability to assess the risk index is not limited to past and present events, in some embodiments, but it may also be used to predict the risk index for future events. As a result, the models may be used to predict the likelihood a risk incident may happen, as well as plan actions (future steps) to decrease the risk index and thus improve continuous risk posture. In particular, the best (estimated) possible next step (or set of steps) may be identified to meet a specific risk management objective in some embodiments.

For continuous risk modeling, in some cases, it is beneficial for embodiments to address both traditional and non-traditional risks. Such embodiments may rely on both traditional and non-traditional risk factors, e.g., taken as input. Known (e.g., in an ontology in memory, or classifiable to such an ontology) risks are easier to model than unknown risks, but even for the former, it is difficult to account for all the actions and circumstances possibly contributing to them. Figuring what contributes to a risk event is expected to be beneficial to protect against its occurrence, and if it does happen, to avoid its recurrence.

Some embodiments manage (e.g., infer and effectuate decisions based on) continuous risk as a time series of events and actions taken (or not) within a system's context (this may include human, computing and other types of components) and implement a methodology to continuously assess a continuous risk posture, or "continuous risk index" ("risk index" for short). The higher the continuous risk index, the more vulnerable the system is to disruption.

Some embodiments dynamically change the risk management models to adapt new economic conditions, in some cases with active learning, and in some cases, by batch re-training of models. This is expected to result in more accurate risk management compared to statistical deficiencies and degradation of stationary credit scoring models. Some embodiment further dynamically change the risk management models based on international incidents that might later on effect the economy. The risk management models may be updated continuously (e.g., within less than 10, 50, or 500 milliseconds, 1 second, 10 seconds, an hour, or a day, of an event that causes a risk score to change) by incoming data and re-trained through an adaptive modeling framework by incorporating new information as soon as it becomes available. By integrating new information, risk management models may detect changes, and the occurrence of a change may point to eventual corrective actions applicable to the models.

In some embodiments, risk management is assessed using a batch data processing model which classifies data in a supervised training environment. The model may use a full-memory time window incorporating all previous data and new data, and the model may use a temporary-memory time window in which only the new data is appended to the training set. Prediction of the trained models using full-memory along with the temporary-memory may provide a dynamic risk assessment. In some cases, e.g., where full-memory time windows are preclude by computing resource constraints, multiheaded attention mechanisms may be applied, e.g., for more detailed, longer time-series data to capture longer range effects of more significant events and interactions, e.g., with a transformer architecture that maps events and relationships therebetween to a continuous space vector representation of lower dimensionality than the events, where location in the vector space, in some embodiments, is indicative of risk.

In some embodiments, machine learning models may be trained using adaptive network-based fuzzy inference systems to convert the current static risk management models into a nonlinear mapping system. The model may be configured to adapt itself to a new input data and gradually minimizes error based on gradient descent training. Trained models may classify customers into different clusters (e.g., with unsupervised learning approaches or supervised learning approaches), using various clustering techniques such as k-means, fuzzy c-means (FCM), and subtractive approaches, based on a risk analysis. The assessment may be used to identify risk factors of the system that are used to determine the risk level.

The prevalence of transactions made by customer in different segments may generate substantial amounts of multivariate time series data for these systems. As a result, real-time anomaly detection for risk management system is expected to have significant and practical applications, which use the information coming in real-time from different sources and tries to detect possible anomalies in the normal condition that may be caused by human error or any form of illegal activities such as fraud. Anomalies can be spatial, and may be referred to as spatial anomalies, which means the values of transactions are outside the typical range. Some embodiments mitigate a risk management system using an unsupervised multivariate anomaly detection method based on Generative Adversarial Networks (GANs) that considers the entire variable set concurrently to capture the latent interactions amongst the variables. Some embodiments mitigate a risk management system using a real-time anomaly detection algorithm based on Hierarchical Temporal Memory (HTM) and Bayesian Network (BN).

The availability of actions and events on many time series, some of which lead to risk-related incidents, in some embodiments, are used to train machine learning models to estimate a risk index at every step in an actual time series of actions and events. These models, in some embodiments, can then be used to predict (e.g., may execute the act of predicting) the likelihood of future incidents, thus providing a continuous assessment of continuous risk.

Training these models with diverse risk data, possibly from a variety of sources, is expected to enrich their ability to address as many different types of risk, system components, and workflows or sections as are contained in the training data. The models may also be able to assess risk for unseen events, as long as they have some degree of similarity to known events in terms of their makeup.

In some embodiments, a machine learning system (such as a system described herein referred to as the Cerebri value system, a recurrent neural network (like a LSTM network), or a Hidden Markov model (like a multi-stage model or a continuous-time model, or other dynamic Bayesian networks) works on (e.g., ingests and responds to) time series of events (steps) leading to reference events by assigning relative weights to each event on the series to reflect their relative contributions to the occurrence and magnitude of reference events. The assignment, in some embodiments, is based on information contained in a large number of time series similar to the one under examination. The system, in some embodiments, thus provides information for events positioned in a time series prior to, or between reference events.

In the context of risk assessment, reference events are "risk events" (e.g., data breaches, denial of service attacks, regulatory, or compliance violations), and their impact may be measured by (and documented in memory with associated values of) remediation costs, brand value, write-down, recovery of finders' fee, revenue loss etc. Events or steps are then actions and events taking place over time, both internal to an entity or part of the environment in which it operates, having some (positive or negative) impact on continuous risk. Costs may be characterized as a score, which may be denominated in currency or other units.

The risk index calculated as per the above, in some embodiments, reflect the continuous risk at every step of a time series. Responsive to these values, some embodiments output a continuous readout on current risk posture and tracking of trends over time. Some embodiments also give (e.g., output) insights into what sub-systems, adjudication function, or workflows may be contributing to the current state of affairs, guiding proactive and corrective actions when needed. Regulatory and compliance risks may include lack of proper procedures and workflows, failure to follow them, or failing regulatory tests (e.g., information assurance, reserve levels).

In some embodiments, an event timeline or other interaction-event record that includes one or more interactions between a customer and a supplier may be determined or otherwise obtained (e.g., from historical logs of a CRM system, complain logs, invoicing systems, and the like). A starting risk value may be assigned to individual events in the event timeline. A sub-sequence comprising a portion of the event timeline that includes at least one reference event may be selected. A classifier may be used to determine a previous relative risk value for a previous event that occurred before the reference event and to determine a next relative risk value for a next event that occurred after the reference event until all events in the event timeline have been processed. The events in the event timeline may be traversed and a risk value assigned to individual events in the event timeline in some embodiments.

In some embodiments, the system facilitates compliance with Know Your Client/Customer (KYC) rules and regulations, for example, implementing an anti-money-laundering system that detect suspicious interaction-events, especially recognizing bots and groups of individuals or companies. Key rules vary from country to country. In Australia, the Anti-Money Laundering and Counter-Terrorism Financing Act 2006 (AML/CTF Act) gives effect to KYC laws. The Anti-Money Laundering and Counter-Terrorism Financing Rules Instrument 2007 provides guidance for applying the powers and requirements of the Act. Compliance is governed by the Australian Government agency, Australian Transaction Reports and Analysis Centre, established in 1989, known as AUSTRAC. In Canada, the Financial Transactions Reports Analysis Centre of Canada, also known as FINTRAC, was created in 2000 as Canada's financial intelligence unit. FINTRAC updated its regulations in June 2016 regarding acceptable methods to determine the identity of individual clients to ensure compliance with AML and KYC regulations. In the United Kingdom, the Money Laundering Regulations 2017 are the underlying rules that govern KYC in the UK. Many UK businesses use the guidance provided by the European Joint Money Laundering Steering Group along with the Financial Conduct Authority's 'Financial Crime: A guide for firms' as an aid to compliance. In the United States, pursuant to the USA Patriot Act of 2001, the Secretary of the Treasury was required to finalize regulations before Oct. 26, 2002 making KYC mandatory for all US banks. The related processes are required to conform to a customer identification program (CIP).

In some embodiments, risk is a trigger for marketing activities, e.g., a user may be added to an audience, selected to receive content via an email or mail, or a bid price for an online ad auction to present content to the user may be calculated based on a risk score.

In some embodiments, risk information is passed to customer. This is expected to allow individuals to understand their own credit profile or how their behavior impacts credit: informing customers of their score, what they can do to improve their score, and what should their stop doing. Some embodiments may compute a measure of contribution of input features (like events or types thereof), indicating a relative contribution of the feature compared to other features, e.g., by weighting deviation of an input feature from a mean or reference value by a measure of feature importance of that input feature of the model.

Models may be trained with various, model-appropriate, training algorithms, including Baum-Welch, gradient descent, and the like.

In some embodiments, some or all of the weights or biases of a recurrent neural network described herein may be calculated by executing a machine learning algorithm on a training set of historical customer journeys. Some embodiments may execute a gradient descent optimization to reduce the error rate and select appropriate weighting and the bias values. In some cases, a predictive model (e.g., a vector of weights) may be calculated as a batch process run periodically. Some embodiments may construct the model by, for example, assigning randomly selected weights or biases; calculating an error amount with which the model describes the historical data and a rates of change in that error as a function of the weights in the model in the vicinity of the current weight (e.g., a derivative, or local slope); and incrementing the weights in a downward (or error reducing) direction. In some cases, these steps may be iteratively repeated until a change in error between iterations is less than a threshold amount, indicating at least a local minimum, if not a global minimum. To mitigate the risk of local minima, some embodiments may repeat the gradient descent optimization with multiple initial random values to confirm that iterations converge on a likely global minimum error. Other embodiments may iteratively adjust other machine learning models to reduce the error function, e.g., with a greedy algorithm that optimizes for the current iteration. The resulting, trained model, e.g., a vector of weights or biases, may be stored in memory and later retrieved for application to new calculations on newly calculated risk scores. In some cases, cyclic loops in the network may be unrolled during training.

Some embodiments may execute a Hidden Markov Model. In some cases, each hidden state may be mapped to a corresponding risk. In some embodiments, the model may be trained with the Baum-Welch algorithm, and the risk may be inferred with the Viterbi algorithm. In some cases, a subset of the training set may be withheld in each of several iterations of training the model to cross validate the model. The model may be trained periodically, e.g., monthly, in advance of use of the model.

In some embodiments, the above techniques may be implemented in a computing environment 10 shown in FIG. 1, for example, with the illustrated continuous stochastic process controller 12, in some cases executing a process described below with reference to FIG. 2, operating for example on data models like those described below with reference to FIG. 3 on computers like those described with reference to FIG. 4.

A variety of different computing architectures are contemplated. In some embodiments, some or all of the components of the computing environment 10 may be hosted by different entities, for instance in remote datacenters that communicate via the Internet or other networks, or in some embodiments, some or all of the components of the computing environment 10 may be co-located within a network of a single entity, for instance co-located in a single datacenter. In some embodiments, the computing environment 10 and the components thereof may be implemented as a monolithic application, for instance, with different illustrated components implemented as different software modules or processes that communicate with one another, for instance via function calls, or in some cases, some or all of the components may be implemented as different processes executing concurrently on a single computing device. In some embodiments, some or all of the illustrated components may be implemented as distinct services executing on different network hosts that communicate with one another via messages exchanged via network stacks of the respective hosts, for instance, according to application program interfaces of each of the distinct services. In some embodiments, some or all of these services may be replicated, for instance, behind load balancers, to afford a relatively scalable architecture, in some cases, with elastic scaling that automatically spins up or down new instances based on load. Some embodiments implement a service-oriented architecture, such as a micro services architecture, with different services hosted on virtual machines or containers executing images corresponding to different services, in some cases, with some services implemented in a serverless architecture, for instance, as lambda functions.

In some embodiments, the controller 12 is configured to train a risk scoring machine learning model based upon historical interaction-event records 14 and then use the trained model to characterize risk as a continuous stochastic variable that is updated as current events are received via the event streams 17. Some embodiments, the computing environment 10 include various interaction-event record data sets 14, an exogenous event repository 16, various event streams 17, and various action-channel servers 18. In some embodiments, the controller 12 may train and apply various machine learning models to inputs from the components 14, 16, and 17 to effectuate various actions implemented via the action-channel servers 18.

In some embodiments, interaction-event records reflecting previous customer risk journeys may be obtained from the interaction-event record repositories 14. Three repositories are shown, but some embodiments may include substantially more. Examples of such repositories include historical process logs, customer relationship management databases, credit reports, insurance claims, records with fraudulent transactions, and the like.

In some embodiments, each record may be time-series of events for one of a relatively large number of independent entities for which actions are selected to influence behavior or responsive to predicted behavior, such as of different people in a population, or in some embodiments, the entity may be non-human, for instance, a state of a robot, a manufacturing process, a market, or a datacenter's HVAC systems. In some embodiments, the number of entities for which interaction-event records are obtained may be more than 1000, more than 10,000, more than 100,000, and in many commercially-relevant use cases, more than a million.

In some cases, each of the interaction-event records may include a timeseries of events experienced by the corresponding subject entity, such as person, robot, industrial process, or datacenter. In some cases, the events may include actions taken by a system controlled by the controller 12 at the direction of the controller 12 based upon a trained model thereof. Examples include the examples described below with reference to action-channel servers 18. Some examples further include directing a thruster in a particular direction and applying a particular amount of thrust for a duration of time in the example of a subsea robot. Other examples include extending credit, offering subsidized hardware to support a subscription, offering insurance, sending an email, causing an advertisement exposure, offering a voucher, offering a seat on an airplane for a specific leg of travel, the assignment of finite resources, sending a coupon or discount offer, calling a person, sending a text message, adjusting a price for a particular person, adding a task to a customer-relationship management (CRM) system, or the like in the example of members of a population to be influenced. In the example of a control system for a datacenter HVAC system, examples include applying a particular set point for temperature or humidity for some duration of time, setting a fan speed for some duration of time, adjusting a balance between external and internal air recirculation, and the like.

In some cases, the events may include actions taken by nonhuman subjects, for instance, changing a process setpoint, actuating a thruster in a particular direction for a particular duration, or undertaking a computing load in a datacenter for some duration. In some cases, the events may include actions taken by different subjects, for instance, people navigating to a website of a merchant, calling a help center of a merchants, contacting a salesperson of a merchant, clicking on an advertisement of a merchant, engaging with a native application of a merchant, physically visiting a storefront of a merchant, being exposed to an advertisement, submitting a review classified as having a particular sentiment among a plurality of different types of sentiments, or the like.

In some embodiments, the events may further include exogenous events, which are events that are not caused by the controller 12 or the subject entity to which a record pertains, but to which the subject entity is exposed or potentially exposed. Examples include phenomena like the weather, ocean currents, and contact by sea creatures in the example of a subsea robot. Other examples include phenomena like recessions, changes in interest rates, and other macro-economic phenomena, along with cultural phenomena, like sporting events, holidays, the Olympics, elections, and the like in the example of members of a human population to be influenced. In some embodiments, the exogenous events are stochastic, and some embodiments may associate with exogenous events an estimated or known probability distribution, like likelihoods of occurring within threshold durations of time. Records of such events may be obtained from repository 16 in some embodiments.

In some cases, records describing histories of events experienced or potentially experienced by subjects are stored in the interaction-event record repository 14 in interaction-event record. In some embodiments, each interaction-event record may correspond to a different subject entity, such as a different robot, person, or datacenter. In some embodiments, each interaction-event record may have associated therewith a unique identifier of the subject, in some cases a pseudonymous identifier.

In some embodiments, each interaction-event record may further include attributes of the subject, like a maximum amount of thrust available in a subsea robot, a range of thruster angles available in such a robot, drag of the robot, and inertial properties of a tether. In another example, the attributes may include attributes of people, like psychometric or demographic attributes, like age, gender, geolocation of residence, geolocation of a workplace, income, number and age of children, whether they are married, and the like. In some embodiments, the attributes may include attributes of a datacenter, for instance, a cooling capacity, an inventory of HVAC equipment therein, a volumetric flow rate maximum for fans, and the like. In some cases, such attributes may include values indicating transient responses to stimulus as well.

In some embodiments, each interaction-event record or records in the repository 16 may further include a timeseries of events experienced by the subject-entity or potentially experienced by the subject entity, such as exogenous events that may or may not have impinged upon the subject entity. In some cases, the time series of events are stored in a format that indicates a sequence of the events, for instance with timestamps of each event, or some embodiments may indicate sequence but not time, which is not to suggest that any other described feature is limiting. In some embodiments, the number of events may be relatively large, such as more than 10, more than 100, or more than 1000 on average for the collection of subject entities for which interaction-event record are stored in the repository 14. In some embodiments, events may be associated with a confidence score indicative of a confidence that the event occurred or was experienced by the respective subject entity. In some embodiments, events may have other attributes, like an intensity of the events, a monetary value of the events, a dwell time on a website, a value indicating whether a person clicks through to an advertisement, and the like for use cases in which humans are the subject. Similarly, events for robots or datacenters may include, for example, a thermal load applied in a datacenter, an amount of current experience and by a subsea robot, and the like. In some embodiments, the events may be arranged in an ontology or a hierarchical taxonomy.

In some embodiments, a value mapping the event to an entry in a taxonomy may indicate whether the event is an action taken by the subject-entity being controlled, an exogenous event, an event to be avoided and for which risk is to be calculated, or an act upon the subject-entity at the direction of the controller or other system to be controlled by the controller. In some embodiments, events corresponding to actions by the subject-entity may have attributes indicating whether the respective event is advancing a goal, such as a goal reflected in an objective function composed by a developer to effectuate the goal, like reducing or minimizing risk of bad outcomes, maximizing likelihood of good outcomes, or a net result based on a combination of both. Examples include an attribute of a robot movement event indicating whether the robot movement event resulted in the robot moving closer to a barrier to be avoided, an attribute of a consumer event indicating whether the consumer purchased a product, an attribute of a user event indicating with the user engaged in some other desired or undesired behavior, like recycling or getting a health checkup, or an attribute of a datacenter event indicating whether a datacenter remains within a targeted band of temperature for a targeted duration of time. In some embodiments, the event attributes may not express whether such attributes are good or bad, merely provide a metric that may be interpreted with, for example, a reward function of the controller 12. In some embodiments, the reward function may be a part of an objective function, or some embodiments may apply other types of objective functions that do not include a reward function, which is not to suggest that any other description is limiting.

In some embodiments, the interaction-event record records are or include the event timelines described in U.S. patent application Ser. No. 15/456,059, titled BUSINESS ARTIFICIAL INTELLIGENCE MANAGEMENT ENGINE, the contents of which are hereby incorporated by reference.

In some cases, interaction-event records may be synthetic interaction-event records. For example, some embodiments may include a generative adversarial network having a generator model and discriminator model trained to, respectively, generate synthetic (e.g., partially or entirely fake) interaction-event records and detect which records are synthetic. The two models may be trained concurrently to attempt to defeat the other, and the end result generator model after training may be configured to output synthetic interaction event records that exhibit properties like real records.

In some embodiments, state to which controller 12 is responsive (e.g., in online use cases after training) may be ingested from various event streams 17 (some may be continuously feeds, and some may be batch feeds), which may take the form of a series of events like those described above. In some embodiments, after the models are trained, subsequent interaction-event records, events thereof, or attributes thereof may be ingested via the event streams 17. In some embodiments, an event stream may be a stream of readings from sensors of a robot, such as inertial measurement unit sensors or range finding sensors. In some cases, an event stream may be attributes of additional members of a population to be evaluated for risk or a new population to be evaluated for risk, or in some cases attributes of events in an event history thereof. In some embodiments, the event stream may be temperature or load assignment signals from a datacenter. In some cases, the ingested stream of data may have associated therewith identifiers like those described above distinguishing different subjects controlled and associated with the inbound events or attributes. In some embodiments, the stream may be a batch process, such as a set of records of subject entities that are members of a population for which a new campaign is being designed to influence the members of the population to engage in some targeted behavior. In some embodiments, the stream may be a real time stream, for instance, with data being supplied as it is obtained by, or in relation to, subject entities, for instance, in queries sent as the data is obtained to request a recommended responsive action in view of the new information.

In some cases, the controller 12 may exercise control (which may be outcome determinative control or merely control over downstream inputs that merely influence a downstream process), via one or more of the action-channel servers 18. In the non-human context, examples of actions include setting a process parameter setpoint (like temperature, rate of acceleration, robot route, workload allocation among data center, and the like). Examples of resulting actions may also include outputting a score indicative of whether a consumer should be sold or marketed a particular product like those described above. Examples of resulting actions may also include configuring a parameter of a product, like an interest rate, amount of collateral, deposit, requirements for a guarantor, amount loaned, amount insured, etc. Examples of resulting actions also include selecting or composing a message to be sent to a consumer based on the risk score of that consumer. Other examples include various dashboards and reports indicative of risk scores for different types of consumers or different types of products, like population statistics, such as measures of central tendency or variation. In some cases, different servers 18 may communicate with various downstream systems, like loan or insurance underwriting computer systems, ERP systems, or CRM systems, to update those systems on predicted current state of risk, e.g., responsive to queries or by pushing updates.

In some embodiments, the continuous stochastic process controller 12 includes a data classifier 20, a model trainer 22, a risk-scoring model 24, a risk-score repository 26, a control module 28, and an explainability module 30.

Classifying performed by the data classifier 20 may take a variety of different forms. Some embodiments may classify interaction-event records according to whether an undesirable outcome occurred as one of the events. In some cases, the undesirability of the outcome may be quantified as well, e.g., with a score. The results may be applied by the classifier 20 to the interaction-event records as, e.g., labels of a labeled training set used for training the model 24. In some embodiments, the classifier 20 may further compress the data that is ingested by removing duplicate records, such as records that are identical but for a subject identifier, and some embodiments provide the resulting filtered de-duplicated records to subsequent processing in a data pipeline like that shown.

In some embodiments, the model trainer 22 may be configured to train the risk-scoring model 24, for example, as a batch process or with active learning. The model and corresponding form of training may take any of the forms described herein, for instance.

In some embodiments, after training, the risk scoring model 24 may update risk-scores in the risk-score repository 26 responsive to new events in event streams 17 as classified by classifier 20. In some embodiments, the risk scores may account for both a likelihood of an event and an expected cost or other measure of undesirability (e.g., downtime, amount a product is out of tolerance, loss of yield, etc.) of that event, e.g., with the product of the two values.

In some embodiments, the resulting risk scores may be accessed by control module 28 to effectuate various actions via the action-channel servers 18, like those actions described above.

In some embodiments, the explainability module 30 may access the risk scores and trained model parameters from the model 24 to advise users, like consumers, those offering products, regulators or auditors, on the causes of the risk scores that are calculated. Examples include outputting one or more metrics associated with one or more events or types of events indicating a measure of a contribution of those events to a given risk score.

In in some cases, a user's computer may query the controller 12 with a request to explain a score, and in response, the controller 12 may determine contributions of various features in that user's history that contribute to the score and magnitudes of those contributions. Such results may be presented to the user to inform the user on how to adjust their behavior to reduce risk in the future.

Figure 2:
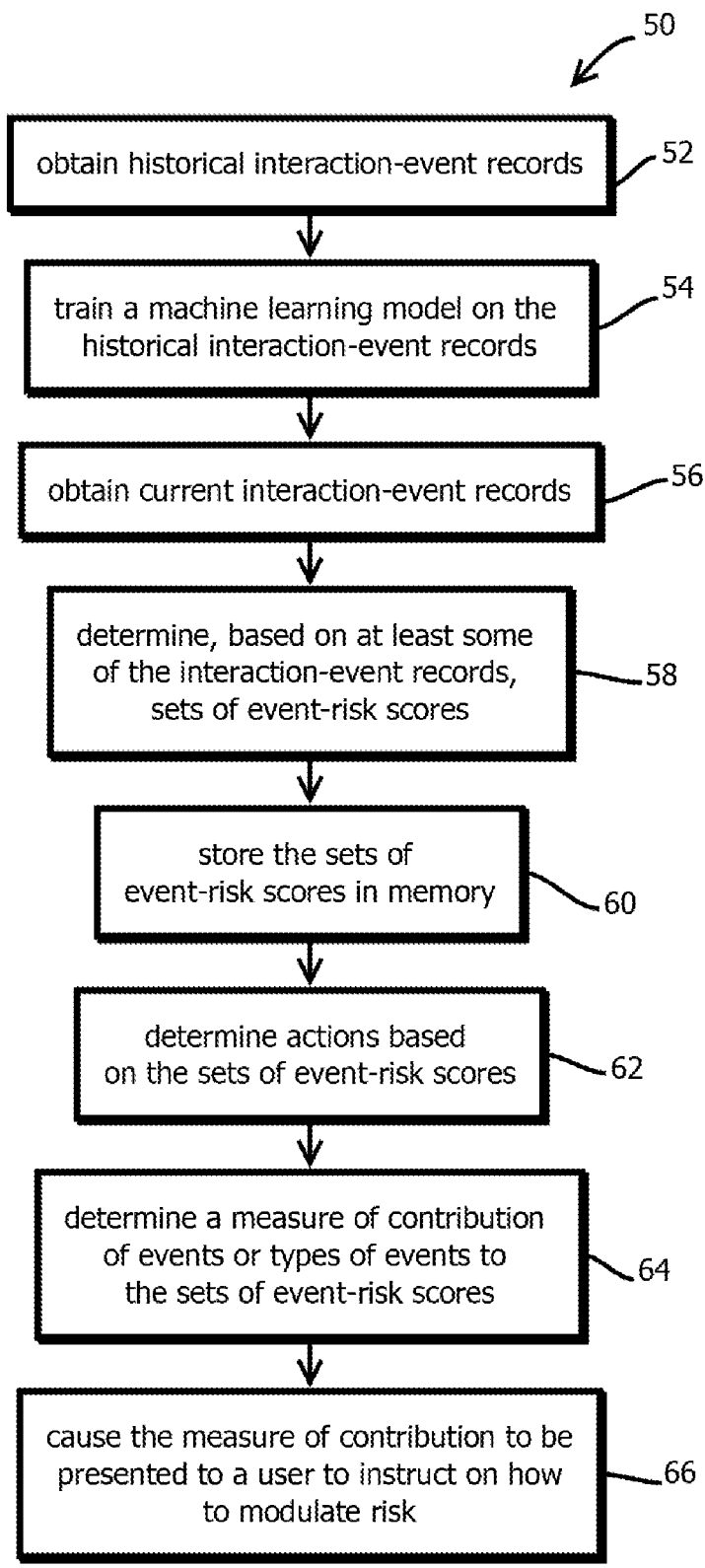
FIG. 2 is a flow chart of a process executed by the continuous stochastic process controller in accordance with some embodiments of the present techniques.

As noted, some embodiments of the controller 12 may execute a process 50 shown in FIG. 2. In some embodiments, different subsets of this process 50 may be executed by the illustrated components of the controller 12. It should be emphasized, though, that embodiments of the process 50 are not limited to implementations with the architecture of FIG. 1, and that the architecture of FIG. 1 may execute processes different from that described with reference to FIG. 2, none of which is to suggest that any other description herein is limiting.

In some embodiments, the process 50 and the other functionality described herein may be implemented with program code or other instructions stored on a tangible, non-transitory, machine-readable medium, such that when the instructions are executed by one or more processors (a term which as used herein refers to physical processors, e.g., implemented on a semiconductor device), the described functionality is effectuated. In some embodiments, notwithstanding use of the singular term "medium," the medium may be distributed, with different subsets of the instructions stored on different computing devices that effectuate those different subsets, an arrangement consistent with use of the singular term "medium" along with monolithic applications on a single device. In some embodiments, the described operations may be executed in a different order, some or all of the operations may be executed multiple times, operations may be executed concurrently with one another or multiple instances of the described process, additional operations may be inserted, operations may be omitted, operations may be executed serially, recursively, or the processes described may otherwise be varied, again none of which is to suggest that any other description herein is limiting.

In some embodiments, the process 50 includes obtaining historical interaction-event records, as indicated by block 52, for example, with the above-described classifier 20 from the interaction-event record repositories 14. In some embodiments, this may further include obtaining exogenous event records from the repository 16 described above.

Next, some embodiments may train a machine learning model on the historical interaction-event records, as indicated by block 54. In some embodiments, this may be performed by the above-described model trainer 22. Some embodiments may then obtain current interaction-event records, as indicated by block 56, again for example, with the classifier 20 from the repositories 14 or streams 17 described above.

Some embodiments may determine, based on at least some of the interaction-event records a set of event risk scores, as indicated by block 58. In some embodiments, this may be performed by the above-described risk-scoring model 24. Some embodiments may then store the sets of event-risk scores in memory, as indicated by block 60, for example, in the above-described risk-score repository 26.

Some embodiments may then determine various actions, for example, selecting among candidates, like launching or applying various campaigns or other programs to consumers, based on the sets of event-risk scores, as indicated by block 62. In some embodiments, this may be performed by the of above-described control module 28.

Some embodiments may further determine a measure of contribution of events or types of events to the sets of event-risk scores, as indicated by block 64, for example with the above-described explainability module 30. In some embodiments may cause the measure of contribution to be presented to a user to the instruct the user on how to modulate risk, as indicated by block 60.

Figure 3:
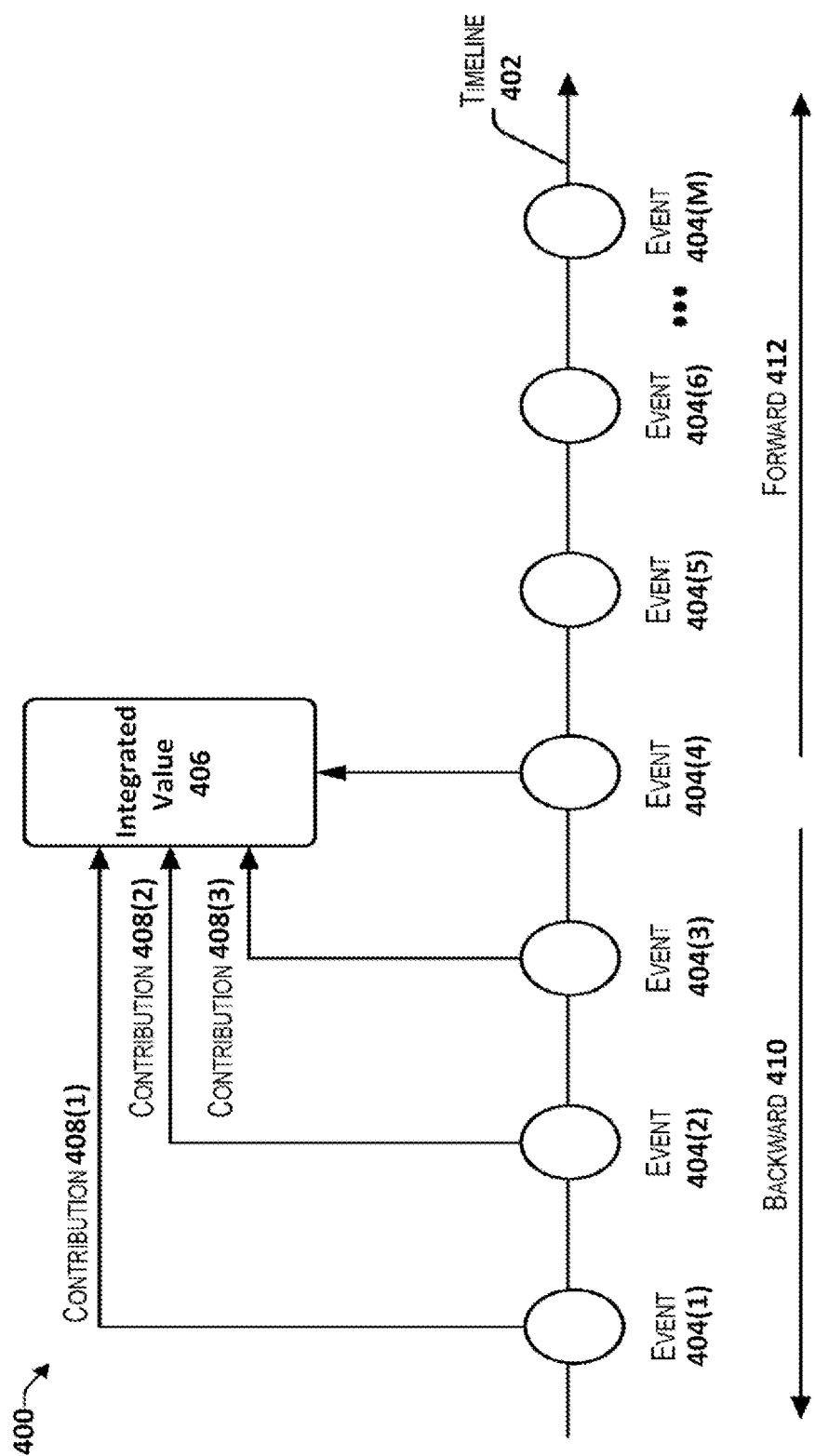
FIG. 3 illustrates an example of a data model of including an interaction-event record operated upon by the continuous stochastic process controller in accordance with some embodiments of the present techniques.

FIG. 3 depicts an example data model 400 used to analyze interaction-event records according to some embodiments. In the data model 400, one or more interaction-event records 402 may be analyzed by the model 24 to produce one or more results 406, which in some cases may be a risk score stored in repository 26 (which may be persistent or non-persistent memory).

For example, the interaction-event records 402 may include previous purchase data, finance data (e.g., associated with consumer financing), demographic data (e.g., customer's age, income, zip code, and the like), CSR contact data (e.g., why, when, and how the customer has contacted a CSR), website access data (e.g., what type of information the customer obtains from the website), warranty data (e.g., warranty claim is indicative of certain customer activities), parts and service data, and marketing data (e.g., how the customer has been provided marketing), for example. Of course, the data sets 402 may include other types of customer-related data.

For example, the interaction-event records 402 may include previous purchase data 404(1), finance data (e.g., associated with consumer financing) 404(2), demographic data (e.g., customer's age, income, zip code, and the like) 404(3), CSR contact data (e.g., why, when, and how the customer has contacted a CSR) 404(4), website access data (e.g., what type of information the customer obtains from the website) 404(5), warranty data 404(6) (e.g., warranty claim is indicative of certain customer activities), and marketing data 404(M) (e.g., how the customer has been provided marketing), where M>0. Of course, the data sets in the record 402 may include other types of customer-related data. These different types of data may be determined to make various contributions 408(1), 408(2), and 408(3) to an integrated value 406, like a risk score, by the presently described machine learning techniques.

Some embodiments of the controller 12 may perform an analysis of the data sets 402 and to determine value indexes 404 based on the analysis and various contributions to an integrated value, like a risk score 406. As illustrated, events may occur in a sequence, with events occurring in a forward direction 412 and backward direction 410 relative to a given event.

Figure 4:
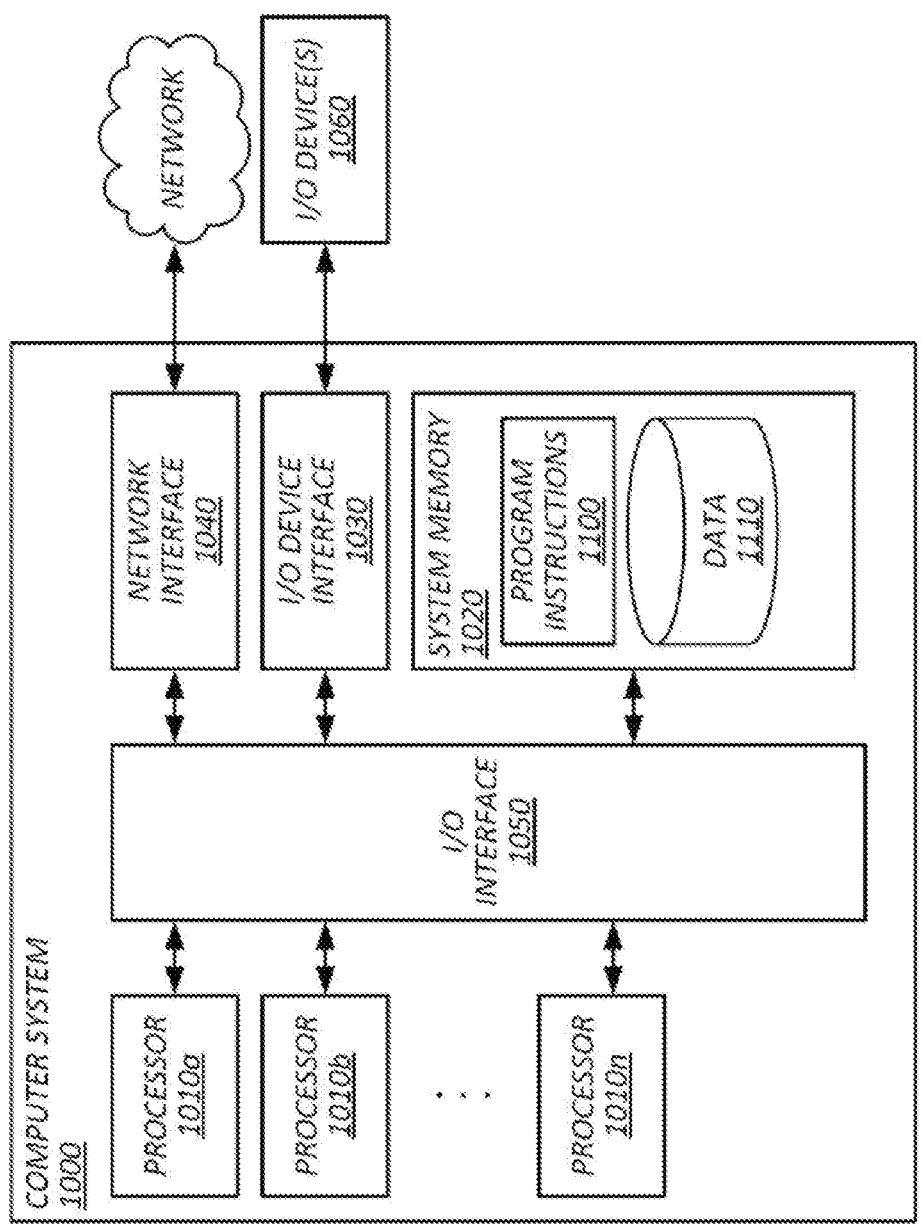
FIG. 4 is an example of a computing device upon which the present techniques may be implemented.

FIG. 4 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A tangible, non-transitory, machine-readable medium storing instructions that when executed by one or more processors effectuate operations comprising: obtaining, with a computer system, one or more out of plurality of datasets having a plurality of interaction-event records, wherein: the interaction-event records describe respective interaction events, the interaction-events are interactions in which a first entity has experiences or obtains other information pertaining to second entity, and at least some of the interaction-event records are associated with respective risks by which sequences of at least some of the interaction events relative to one another are ascertainable; determining, with the computer system, based on at least some of the interaction-event records, sets of event-risk scores, the sets corresponding to at least some of the interaction events, wherein: at least some respective event-risk scores are indicative of an effective of a respective risk ascribed by the first entity to a respective aspect of the second entity; and at least some respective event-risk scores are based on both: respective contributions of respective corresponding events to a subsequent event in the one or more out of the plurality of datasets, and a risk ascribed to a subsequent event in the one or more out of the plurality of datasets, the subsequent event occurring after the respective corresponding events; and storing, with the computer system, the sets of event-risk scores in memory.

2. The medium of embodiment 1, wherein: for at least a plurality of the interaction events, a set of event-risk scores is determined for the respective interaction-event among the plurality of the interaction-events.

3. The medium of any one of embodiments 1-2, wherein: each of at least some of the sets of event-risk scores include a plurality of different scores corresponding to different requests of the second entity to which the first entity ascribes respective risks.

4. The medium of embodiment 3, wherein: the request includes request of a collateralized offering, request of a collateralized offering, a request of a new offering, a modification of existing offering, obtaining a product at a cost that is subsidized in exchange for a promise of future behavior, or insurance.

5. The medium of embodiment 3, wherein: different offerings are associated with different sets of risk profiles.

6. The medium of any one of embodiments 1-5, wherein: where when the event-risk score of a plurality of interaction events fits within a preset or dynamically determined simplex, in response, a set of interaction-events is initiated.

7. The medium of any one of embodiments 1-6, wherein, for at least some of the sets of event-risk scores, each respective set includes both: a respective weight corresponding to a contribution of the respective interaction event toward influencing the first entity to cause the subsequent event, and a respective risk index based on a product of respective weight and a risk ascribed to the subsequent event by the second entity.

8. The medium of any one of embodiments 1-7, wherein: the events include both transaction and non-transaction events; the events include both direct and indirect interactions; the events include factors, demographic, or macro-economic events; the events include credit score; the event includes social media information; the events include the timing classification of other events, the interaction-event records are obtained from diverse data sets; or at least some of the event-risk scores are determined at least in part with a machine learning classifier.

9. The medium of any one of embodiments 1-8, wherein: the events include both transaction and non-transaction events; the events include both direct and indirect interactions; the events include factors, demographic, or macro-economic events; the events include credit score; the event includes social media information; the interaction-event records are obtained from diverse data sets; and at least some of the event-risk scores are determined at least in part with a machine learning classifier.

10. The medium of any one of embodiments 1-9, wherein: the events include factors, demographic, or macro-economic events; the events include credit score; the events include social media information; and the events include Know Your Client rules; the interaction-event records are obtained from diverse data sets; or at least some of the event-risk scores are determined at least in part with a machine learning classifier.

11. The medium of any one of embodiments 1-10, wherein determining sets of event-risk scores comprises: determining initial risks of at least one type of score in the sets of event-risk scores; and iteratively adjusting the at least one type of score with machine learning.

12. The medium of any one of embodiments 1-11, comprising: obtaining a designation of one of the events as a reference event; obtaining a risk ascribed to the reference event by the first entity; selecting a portion of an event timeline including a subset of the events among which is the reference event; determining, using a classifier, relative risks for at least some events in the subset; and assigning a risk index to individual events among the subset.

13. The medium of any one of embodiments 1-12, the operations comprising: selecting a type of interaction for the first entity to experience in the future based on the sets of event-risk scores stored in memory.

14. The medium of any one of embodiments 1-13, wherein: the events include both real interactions and synthesized interactions.

15. The medium of any one of embodiments 1-14, comprising: obtaining a designation of one of the events as a reference event; obtaining a risk ascribed to the reference event by the first entity; selecting a portion of an event timeline including a subset of the events among which is the reference event; determining, using a classifier, relative risks for at least some events in the subset; assigning a risk index to individual events among the subset; and setting or resetting parameters of one or more transactions with second entity.

16. The medium of any one of embodiments 1-15, comprising: determining a measure of a contribution of a given event or type of events to an event-risk score for an individual among the sets of event-risk scores; and causing a visual indication of measure of a contribution of a given event or type of events to be presented to indicate how to modify the event-risk score for the individual.

17. The medium of any one of embodiments 1-16, wherein: determining sets of event-risk scores comprises determining sets of event-risk scores with a dynamic Bayesian network.

18. The medium of any one of embodiments 1-17, wherein: determining sets of event-risk scores comprises determining sets of event-risk scores with a directed cyclic graph of perceptrons.

19. A computing system comprising: a logic subsystem including one or more processors; and a storage subsystem comprising a tangible, non-transitory storage device or devices, the storage subsystem comprising machine-readable medium storing instructions by the logic subsystem to implement a fraud detection platform and, for a journey of interaction-events available in a fraud detection platform, extract or receive information from the journey of interaction-events regarding attributes related to an entity's progress in the journey of interaction-events, the attributes provided by the journey of interaction-events to the fraud detection attributes for each entity of a plurality of entities; for each entity of the plurality of entities, apply a classifying function to classify the entity progress in the journey of interaction-events as normal or as outlying based upon the attributes provided by the journey of interaction-events to the fraud detection platform, the classifying function being trained via machine learning; based at least in part on entity progress in the journey of interaction-events being classified as outlying, then take an action based upon classification as outlying; and based at least in part on the user progress in the journey of interaction-events not being classified as outlying, then not take the action 20. A method, comprising: the operations of any one of embodiments 1-19.

21. A system, comprising: one or more processors; and memory storing instructions that when executed by the processors cause the processors to effectuate operations comprising: the operations of any one of embodiments 1-19.

What is claimed is:

1. A tangible, non-transitory, machine-readable medium storing instructions that when executed by one or more processors effectuate operations comprising:
  obtaining, with a computer system, one or more out of a plurality of datasets having a plurality of interaction-event records, wherein:
    the interaction-event records describe respective interaction events,
    the interaction-events are interactions in which a first entity has experiences or obtains other information pertaining to second entity, and
    at least some of the interaction-event records are associated with respective risks by which sequences of at least some of the interaction events relative to one another are ascertainable;
  determining, with a continuous stochastic process controller executed by multiple computing devices of the computer system, based on at least some of the interaction-event records, sets of event-risk scores, the sets corresponding to at least some of the interaction events, wherein:
    at least some respective event-risk scores are indicative of an effective of a respective risk ascribed by the first entity to a respective aspect of the second entity; and
    at least some respective event-risk scores are based on both:
      respective contributions of respective corresponding events to a subsequent event in the one or more out of the plurality of datasets, and
      a risk ascribed to a subsequent event in the one or more out of the plurality of datasets, the subsequent event occurring after the respective corresponding events; and
  storing, with the computer system, the sets of event-risk scores in memory.

2. The medium of claim 1, wherein:
  for at least a plurality of the interaction events, a set of event-risk scores is determined for the respective interaction-event among the plurality of the interaction-events.

3. The medium of claim 1, wherein:
  each of at least some of the sets of event-risk scores include a plurality of different scores corresponding to different requests of the second entity to which the first entity ascribes respective risks.

4. The medium of claim 3, wherein:
  the request includes request of a collateralized offering, request of a collateralized offering, a request of a new offering, a modification of existing offering, obtaining a product at a cost that is subsidized in exchange for a promise of future behavior, or insurance.

5. The medium of claim 3, wherein:
  different offerings are associated with different sets of risk profiles.

6. The medium of claim 1, wherein:
  where when the event-risk score of a plurality of interaction events fits within a preset or dynamically determined simplex, in response, a set of interaction-events is initiated.

7. The medium of claim 1, wherein, for at least some of the sets of event-risk scores, each respective set includes both:
  a respective weight corresponding to a contribution of the respective interaction event toward influencing the first entity to cause the subsequent event, and
  a respective risk index based on a product of respective weight and a risk ascribed to the subsequent event by the second entity.

8. The medium of claim 1, wherein:
  the events include both transaction and non-transaction events;
  the events include both direct and indirect interactions;
  the events include factors, demographic, or macro-economic events;
  the events include credit score;
  the events include timing classifications of events;
  the event includes social media information;
  the interaction-event records are obtained from diverse data sets; or
  at least some of the event-risk scores are determined at least in part with a machine learning classifier.

9. The medium of claim 1, wherein:
  the events include both transaction and non-transaction events;
  the events include both direct and indirect interactions;
  the events include factors, demographic, or macro-economic events;
  the events include credit score;
  the event includes social media information;
  the interaction-event records are obtained from diverse data sets; and
  at least some of the event-risk scores are determined at least in part with a machine learning classifier.

10. The medium of claim 1, wherein:
  the events include factors, demographic, or macro-economic events;
  the events include credit score;
  the events include social media information; and
  the events include Know Your Client rules;
  the interaction-event records are obtained from diverse data sets; or
  at least some of the event-risk scores are determined at least in part with a machine learning classifier.

11. The medium of claim 1, wherein determining sets of event-risk scores comprises:
  determining initial risks of at least one type of score in the sets of event-risk scores; and
  iteratively adjusting the at least one type of score with machine learning.

12. The medium of claim 1, comprising:
  obtaining a designation of one of the events as a reference event;

obtaining a risk ascribed to the reference event by the first entity;
selecting a portion of an event timeline including a subset of the events among which is the reference event;
determining, using a classifier, relative risks for at least some events in the subset; and
assigning a risk index to individual events among the subset.

13. The medium of claim 1, the operations comprising:
selecting a type of interaction for the first entity to experience in the future based on the sets of event-risk scores stored in memory.

14. The medium of claim 1, wherein:
the events include both real interactions synthesized interactions.

15. The medium of claim 1, comprising:
obtaining a designation of one of the events as a reference event;
obtaining a risk ascribed to the reference event by the first entity;
selecting a portion of an event timeline including a subset of the events among which is the reference event;
determining, using a classifier, relative risks for at least some events in the subset;
assigning a risk index to individual events among the subset; and
setting or resetting parameters of one or more transactions with second entity.

16. The medium of claim 1, comprising:
determining a measure of a contribution of a given event or type of events to an event-risk score for an individual among the sets of event-risk scores; and
causing a visual indication of measure of a contribution of a given event or type of events to be presented to indicate how to modify the event-risk score for the individual.

17. The medium of claim 1, comprising:
steps for monitoring or controlling a continuous stochastic process.

18. The medium of claim 1, wherein:
determining sets of event-risk scores comprises determining sets of event-risk scores with a dynamic Bayesian network.

19. The medium of claim 1, wherein:
determining sets of event-risk scores comprises determining sets of event-risk scores with a directed cyclic graph of perceptrons.

20. The medium of claim 1, wherein the continuous stochastic process controller comprises a transformer architecture that maps events and relationships therebetween to a continuous space vector representation of lower dimensionality than the mapped events, wherein location in the vector space is indicative of risk.

21. The medium of claim 1, wherein the continuous stochastic process controller comprises multiheaded attention.

22. The medium of claim 1, wherein the continuous stochastic process controller comprises:
a data classifier,
a model trainer,
a risk-scoring model,
a risk-score repository,
a control module, and
an explainability module.

23. The medium of claim 1, wherein the continuous stochastic process controller comprises:
a data classifier,
a model trainer,
a risk-scoring model,
a risk-score repository,
a control module, or
an explainability module.

24. A method, comprising:
obtaining, with a computer system, one or more out of a plurality of datasets having a plurality of interaction-event records, wherein:
the interaction-event records describe respective interaction events,
the interaction-events are interactions in which a first entity has experiences or obtains other information pertaining to second entity, and
at least some of the interaction-event records are associated with respective risks by which sequences of at least some of the interaction events relative to one another are ascertainable;
determining, with a continuous stochastic process controller executed by the computer system, based on at least some of the interaction-event records, sets of event-risk scores, the sets corresponding to at least some of the interaction events, wherein:
at least some respective event-risk scores are indicative of an effective of a respective risk ascribed by the first entity to a respective aspect of the second entity; and
at least some respective event-risk scores are based on both:
respective contributions of respective corresponding events to a subsequent event in the one or more out of the plurality of datasets, and
a risk ascribed to a subsequent event in the one or more out of the plurality of datasets, the subsequent event occurring after the respective corresponding events; and
storing, with the computer system, the sets of event-risk scores in memory.

25. The medium of claim 1, wherein the operations comprise:
training, with the continuous stochastic process controller, based on the interaction-event records, a risk-scoring machine learning model, wherein after training, the risk-scoring machine learning model is operative to model a stochastic attribute that is updated as events are received via a plurality of event streams.

26. The medium of claim 25, wherein:
the interaction-events are interactions in which a first entity has experiences or obtains other information pertaining to a set of more than 10,000 other entities, the set including the second entity; and
the risk-scoring machine learning model is updated within less than 500 milliseconds of receiving a given event in one of the streams.

* * * * *